US008831685B2

United States Patent
Kitahara (10) Patent No.: US 8,831,685 B2
(45) Date of Patent: Sep. 9, 2014

(54) WIRELESS BASE STATION AND METHOD FOR PERFORMING STABLE COMMUNICATION BY SELECTING ANTENNAS ACCORDING TO TRANSMISSION ENVIRONMENTS

(75) Inventor: Minako Kitahara, Yokohama (JP)

(73) Assignee: Kyocera Corporation, Kyoto (JP)

( * ) Notice: Subject to any disclaimer, the term of this patent is extended or adjusted under 35 U.S.C. 154(b) by 925 days.

(21) Appl. No.: 13/001,612

(22) PCT Filed: Jun. 25, 2009

(86) PCT No.: PCT/JP2009/061647
§ 371 (c)(1),
(2), (4) Date: Mar. 15, 2011

(87) PCT Pub. No.: WO2009/157518
PCT Pub. Date: Dec. 30, 2009

(65) Prior Publication Data
US 2011/0306371 A1    Dec. 15, 2011

(30) Foreign Application Priority Data

Jun. 27, 2008  (JP) .................. 2008-169350
Jul. 30, 2008  (JP) .................. 2008-196827

(51) Int. Cl.
| | |
|---|---|
| H04W 88/08 | (2009.01) |
| H04B 7/02 | (2006.01) |
| H04B 7/04 | (2006.01) |
| H04B 7/08 | (2006.01) |
| H04W 72/08 | (2009.01) |
| H01Q 3/24 | (2006.01) |
| H04W 72/04 | (2009.01) |

(52) U.S. Cl.
CPC ............ *H04B 7/0413* (2013.01); *H04B 7/0808* (2013.01); *H04W 72/085* (2013.01); *H01Q 3/24* (2013.01); *H04B 7/0874* (2013.01); *H04W 72/046* (2013.01)
USPC ................... 455/562.1; 455/277.2; 455/67.11

(58) Field of Classification Search
None
See application file for complete search history.

(56) References Cited

U.S. PATENT DOCUMENTS

| | | | |
|---|---|---|---|
| 6,694,154 B1 * | 2/2004 | Molnar et al. | ............. 455/277.1 |
| 7,369,832 B2 | 5/2008 | Cho | |
| 2008/0152030 A1 * | 6/2008 | Abramov et al. | ............. 375/260 |

FOREIGN PATENT DOCUMENTS

| | | |
|---|---|---|
| CN | 200980124661.2 | 2/2013 |
| JP | 06-140971 | 5/1994 |
| JP | 2000-252734 | 9/2000 |
| JP | 2007-028569 | 2/2007 |
| JP | 2007-214759 | 8/2007 |
| JP | 2008-085897 | 4/2008 |
| JP | 2008-136089 | 6/2008 |
| JP | 2008-169350 | 3/2011 |
| KR | 20040098118 | 11/2004 |
| KR | 10-2010-7029254 | 2/2012 |
| WO | 2006/103758 A1 | 10/2006 |

* cited by examiner

*Primary Examiner* — Philip Sobutka
(74) *Attorney, Agent, or Firm* — Workman Nydegger (57) ABSTRACT

A reception quality information obtaining unit obtains reception quality information indicating reception quality of each of a plurality of antennas at predetermined intervals. A reception quality variation trend recognition unit recognizes a variation trend of a value in relation to reception quality of each of the antennas obtained. A correlation determination unit determines a degree of correlation between the antennas based on the variation trend of the value in relation to the reception quality of each of the antennas recognized. An antenna selection unit selects at least two antennas to be used for wireless communication, based on the degree of correlation between the antennas determined by the correlation determination unit.

13 Claims, 8 Drawing Sheets

WIRELESS BASE STATION AND METHOD FOR PERFORMING STABLE COMMUNICATION BY SELECTING ANTENNAS ACCORDING TO TRANSMISSION ENVIRONMENTS

CROSS REFERENCE TO RELATED APPLICATIONS

This application claims priority to and the benefit of Japanese Patent Application No. 2008-169350 (filed on Jun. 27, 2008) and Japanese Patent Application No. 2008-196827 (filed on Jul. 30, 2008), the entire contents of which are incorporated herein by reference.

TECHNICAL FIELD

The present invention relates to a wireless base station having an adaptive array antenna and a wireless communication method of the wireless base station.

BACKGROUND ART

At the wireless base station for performing communications by using an adaptive array antenna, the adaptive array antenna has different effects based on arrangements of antenna elements. When the antenna elements of the adaptive array antenna are arranged at short intervals, antenna correlation becomes high, which enables to handle fluctuations of fading. In contrast, when the antenna elements of the adaptive array antenna are arranged at long intervals, the antenna correlation becomes low, which promises a high diversity effect.

Accordingly, in order to enhance the diversity effect, the wireless base station arranges the antenna elements at several wavelength intervals (group A) in consideration of the antenna correlation stated above. However, since the antenna elements are arranged at long intervals, this wireless base station has a problem that it is difficult to control directivity to separate transmission waves (desired waves) transmitted from a terminal A and transmission waves (interference waves) transmitted from a terminal B. In order to address such problem, there is suggested an antenna device of a wireless base station which has antenna elements (group B) arranged at wavelength intervals different from those of a group A and, if it is not possible to perform a desired directivity control, changes directivity characteristics by switching from any of antennas in the group A being used to any of the antenna elements in the group B in order to separate the desired waves from the interference waves (see Patent Document 1).

In addition, a wireless communication system including an adaptive array wireless base station having a plurality of antenna elements and a mobile communication terminal may have a problem that at reception throughput is deteriorated in some conditions of a user of the terminal performing wireless communications with the wireless base station. For example, if the user is using the terminal while moving at a speed equal to or faster than 80 km/h, it causes fast fading variation in reception signals, which deteriorates throughput.

In order to obtain better throughput, there is suggested a wireless communication apparatus which selects transmission by the adaptive array antenna or transmission by MIMO, based on reception quality information obtained from a communication terminal of a counterpart (see Patent Document 2).

RELATED ART DOCUMENTS

Patent Documents

Patent Document 1: Japanese Patent Application Laid-Open No. 2000-252734 Patent Document 2: Japanese Patent Application Laid-Open No. 2007-28569

SUMMARY OF INVENTION

Technical Problem

The antenna device of the wireless base station in the above Patent Document 1 separates the desired waves and the interference waves by changing directivity characteristics by simply switching any antenna element being used and ensures diversity effect. Therefore, this antenna device of the wireless base station cannot deal with fast fading variations caused by fast movement (for example, 80 km/h or higher) of the terminal A by simply switching any antenna element and thus cannot perform appropriate directivity control.

In addition, the wireless communication apparatus described in the above Patent Documents 2, when performing wireless communications by a selected transmission method, may not be able to obtain optimum throughput according to the interval at which antenna elements used for the wireless communication are arranged. This is because, since the antenna elements arranged at short intervals render the antenna correlation (fading correlation) high while the antenna elements arranged at long intervals render the antenna correlation low, the wireless communication apparatus does not select the antenna elements suitable for the transmission method selected according to the interval of antennas used for the wireless communications, and therefore the communication quality cannot be maintained.

Therefore, there is a problem that, with mere change of the transmission method of the radio signals, the wireless communication apparatus cannot obtain optimum throughput by the transmission method selected to deal with variations of the transmission environment depending on the user's usage situations.

An object of the present invention in consideration of such problem is to provide a wireless base station and a wireless communication method capable of performing stable communication by selecting antennas according to varying transmission environments. Another object of the present invention is to provide a wireless base station and a wireless communication method capable of maintaining the communication quality and obtaining optimum throughput when selecting a transmission method of radio signals according to a variation of the transmission environment.

Solution to Problem

According to a first aspect of the present invention, a wireless base station having a plurality of antennas and performing wireless communication by using at least two antennas includes: an obtaining unit for obtaining reception quality information of each of the plurality of antennas; a recognition unit for recognizing a variation trend of a value in relation to reception quality of each of the antennas obtained by the obtaining unit; and a selection unit for selecting at least two antennas, among the plurality of antennas, to be used for wireless communication, based on the variation trend of the value in relation to the reception quality of each of the antennas, recognized by the recognition unit.

It is preferred that the wireless base station further includes a determination unit for determining a degree of correlation between the antennas based on the variation trend of the value in relation to the reception quality of each of the antennas recognized by the recognition unit, wherein the selection unit selects at least two antennas to be used for the wireless communication based on the degree of correlation between the antennas determined by the determination unit.

It is preferred that the determination unit detects a time at which, in the variation trend of the value in relation to the reception quality of each of the antennas recognized by the recognition unit, the value in relation to the reception quality falls by a first predetermined value or more in comparison with a previous value in relation to the reception quality obtained, and determines the degree of correlation based on a difference in the time detected for each of the antennas.

It is preferred that the determination unit detects a time at which, in the variation trend of the value in relation to the reception quality of each of the antennas recognized by the recognition unit, the value in relation to the reception quality becomes equal to or lower than a second predetermined value, and determines the degree of correlation based on a frequency of the detected time at which the value in relation to the reception quality of each of the antennas becomes equal to or lower than the predetermined value.

It is preferred that the wireless base station further includes a calculation unit for calculating a weight of each of the plurality of antennas, wherein the selection unit selects at least two antennas to be used for the wireless communication based on an interval to calculate the weight by the calculation unit and a period of occurrence of the time determined by the determination unit.

It is preferred that the obtaining unit obtains reception quality information of radio signals received by each of the plurality of antennas at a predetermined interval, the recognition unit recognizes the variation trend of the value in relation to the reception quality of each of the antennas, and the determination unit estimates a value in relation to the reception quality of each of the antennas based on the variation trend of each of the antennas and determines the degree of correlation between the antennas based on the estimated value in relation to the reception quality.

According to a second aspect of the present invention, a wireless communication method of a wireless base station having a plurality of antennas and performing wireless communication by using at least two antennas includes the steps of: obtaining reception quality information of each of the plurality of antennas; recognizing a variation trend of a value in relation to reception quality of each of the antennas obtained at the obtaining step; and selecting at least two antennas, among the plurality of antennas, to be used for the wireless communication based on the variation trend of the value in relation to the reception quality of each of the antennas recognized at the recognizing step.

According to a third aspect of the present invention, a wireless base station having a plurality of antennas and performing wireless communication with a communication counterpart apparatus includes: an obtaining unit for obtaining reception quality information of each of the plurality of antennas; a recognition unit for recognizing a variation trend of a value in relation to reception quality of each of the antennas obtained by the obtaining unit; a selection unit for determining a transmission method of the wireless communication based on the variation trend of the value in relation to the reception quality of each of the antennas recognized by the recognition unit and selecting an antenna, among the plurality of antennas, to be used by the transmission method determined; and a transmission unit for transmitting information on the transmission method determined by the selection unit to the communication counterpart apparatus.

It is preferred that the wireless base station further includes a determination unit for determining a degree of correlation between the antennas based on the variation trend of the value in relation to the reception quality of each of the antennas recognized by the recognition unit, and the selection unit selects an antenna to be used for the wireless communication based on the degree of correlation between the antennas determined by the determination unit.

It is preferred that the determination unit detects a time at which, in the variation trend of the value in relation to the reception quality of each of the antennas recognized by the recognition unit, the value in relation to the reception quality falls by a third predetermined value or more in comparison with a previous value in relation to the reception quality obtained, and determines the degree of correlation based on a difference in the detected time of each of the antennas.

It is preferred that the determination unit detects a time at which, in the variation trend of the value in relation to the reception quality of each of the antennas recognized by the recognition unit, the value in relation to the reception quality becomes equal to or lower than a fourth predetermined value, and determines the degree of correlation based on a frequency of detected time at which the value in relation to the reception quality of each of the antennas becomes equal to or lower than a predetermined value.

It is preferred that the plurality of antennas is an array antenna and the selection unit determines wireless communication by directivity control or wireless communication by MIMO as the transmission method of the wireless communication.

It is preferred that the wireless base station further includes a calculation unit for calculating a weight of each of the plurality of antennas, wherein the selection unit determines the transmission method to be used for the wireless communication, based on an interval to calculate the weight by the calculation unit and a period of occurrence of the time determined by the determination unit.

It is preferred that the obtaining unit obtains reception quality information of radio signals received by each of the plurality of antennas at predetermined intervals, the recognition unit recognizes the variation trend of the value in relation to the reception quality of each of the antennas, and the determination unit estimates a value in relation to the reception quality of each of the antennas in a predetermined period based on the variation trend of each of the antennas and determines the degree of correlation between the antennas based on the estimated value in relation to the reception quality.

According to a fourth aspect of the present invention, a wireless communication method of a wireless base station having a plurality of antennas and performing wireless communication with a communication counterpart apparatus includes: an obtaining step for obtaining reception quality information of each of the plurality of antennas; a recognition step for recognizing a variation trend of a value in relation to reception quality of each of the antennas obtained at the obtaining step; a selection step for determining a transmission method of the wireless communication based on the variation trend of the value in relation to the reception quality of each of the antennas recognized at the recognition step and selecting an antenna, among the plurality of antennas, to be used for the wireless communication; and a transmission step for transmitting information on the transmission method determined at the selection step to the communication counterpart apparatus.

Effect of the Invention

According to the present invention, the wireless base station can select an antenna suitable for varying transmission environments and thus can perform a stable communication.

Moreover, according to the present invention, the wireless base station selects a transmission method suitable for the transmission environment based on the variation trend of the value in relation to the reception quality of each of the antennas and also selects an antenna element suitable for the transmission method selected, thereby is capable of maintaining communication quality and obtaining optimum throughput.

DESCRIPTION OF EMBODIMENTS

Embodiments of the present invention will be described with reference to the accompanying drawings.

First Embodiment

Figure 1:
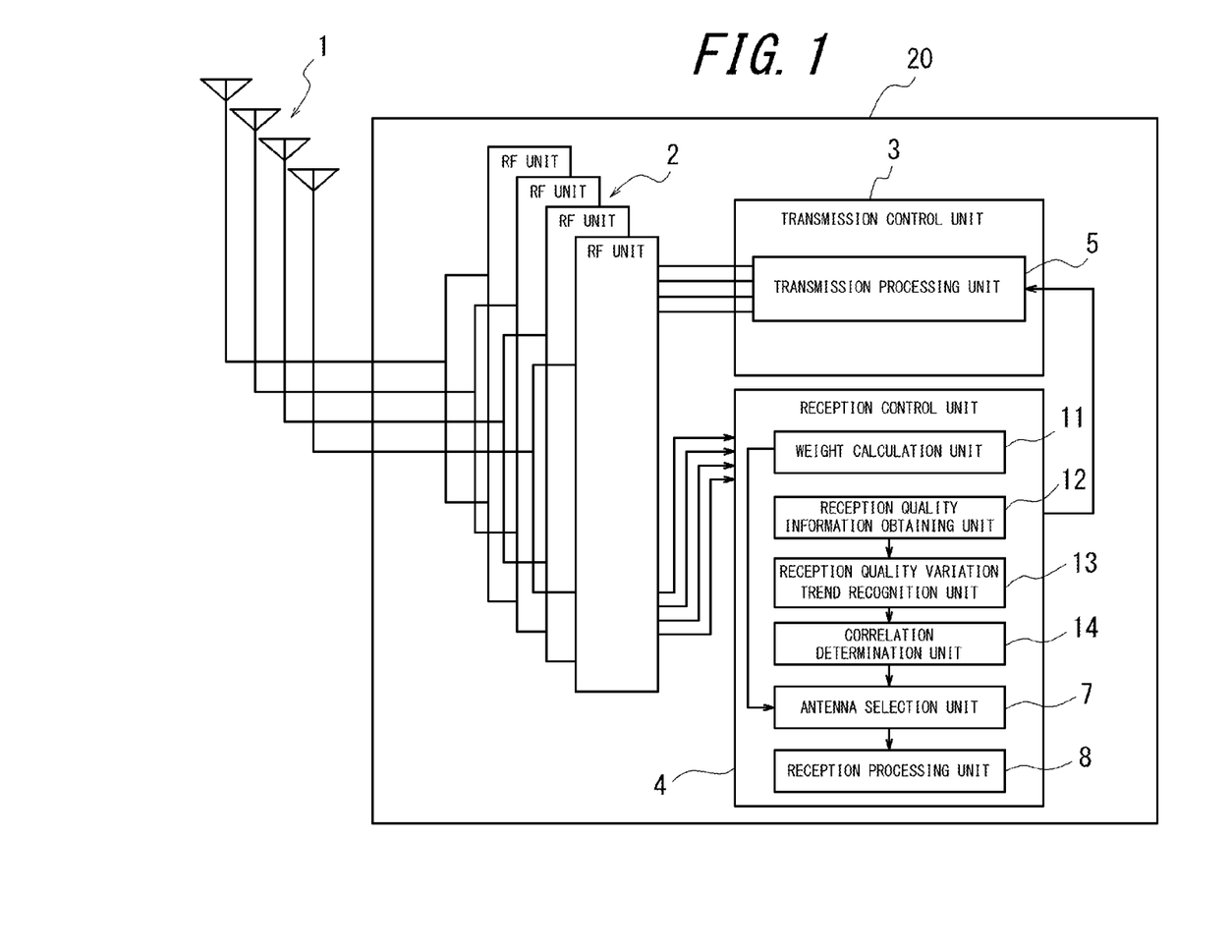
FIG. 1 is a block diagram illustrating an exemplary configuration of a wireless base station according to a first embodiment of the present invention.

FIG. 1 is a block diagram illustrating an exemplary configuration of a wireless base station according to a first embodiment of the present invention. In FIG. 1, a wireless base station 20 includes a plurality of antenna elements 1, a plurality of wireless (RF) units 2 provided to respective antennas for up/down conversion of radio signals from a counterpart communication apparatus, a transmission control unit 3 and a reception control unit 4. The transmission control unit 3 has a transmission processing unit 5. The reception control unit 4 has a weight calculation unit (calculation unit) 11, a reception quality information obtaining unit (obtaining unit) 12, a reception quality variation trend recognition unit (recognition unit) 13, a correlation determination unit (determination unit) 14, an antenna selection unit (selection unit) 7 and a reception processing unit 8. The weight calculation unit 11 calculates a weight of each of the plurality of antennas. The reception quality information obtaining unit 12 obtains reception quality information indicating reception quality of each of the plurality of antennas at predetermined intervals. The reception quality variation trend recognition unit 13 recognizes a variation trend of a value in relation to the reception quality of each antenna obtained by the reception quality information obtaining unit 12. The correlation determination unit 14 determines a degree of correlation between the antennas based on the variation trend of the value in relation to the reception quality of each antenna recognized by the reception quality variation trend recognition unit 13. The antenna selection unit 7 selects an antenna, among the plurality of antennas, to be used for wireless communications based on the degree of correlation between antennas determined by the correlation determination unit 14. The reception processing unit 8 performs processing to form beams radiated from the antenna selected. Although the weight calculation unit 11, the reception quality information obtaining unit 12, the reception quality variation trend recognition unit 13 and the correlation determination unit 14 are provided to the reception control unit 4 in the present embodiment, those units may also be constituted independently.

The reception quality information obtaining unit 12 obtains reception quality information of radio signals received from the communication apparatus of a communication counterpart. The reception quality information obtaining unit 12 obtains a value indicating received power or a value indicating the reception quality such as SINR measured for each of the plurality of antennas as the value in relation to the reception quality in the reception quality information. The reception quality variation trend recognition unit 13 recognizes a variation trend of the value in relation to the reception quality of each antenna obtained.

The correlation determination unit 14 determines the degree of correlation based on the variation trend of the value in relation to the reception quality of each antenna recognized by the reception quality variation trend recognition unit 13.

The antenna selection unit 7 selects at least two antenna elements, among the plurality of antennas, to be used for the wireless communication based on the degree of correlation between antennas determined by the correlation determination unit 14. The antennas selected by the antenna selection unit 7 are used to receive radio signals from the communication apparatus of the counterpart as well as to transmit radio signals to the communication apparatus of the counterpart.

Next, a method of selecting the antenna by the antenna selection unit 7 based on the degree of correlation between the antennas determined by the correlation determination unit 14 is described with reference to a flowchart in FIG. 2. It is assumed that the plurality of antennas is provided as an array antenna and that the weight calculation unit 11 calculates a weight of each antenna of the array antenna.

The reception control unit 4 of the wireless base station starts a communication with the communication apparatus of the counterpart (step 101). The reception quality information obtaining unit 12 obtains reception quality information of the radio signal received by each antenna, and the reception quality variation trend recognition unit 13 recognizes the variation trend of the value in relation to the reception quality in the reception quality information of each antenna obtained (step 102). The correlation determination unit 14 determines the degree of correlation between antennas based on the variation trend of each antenna recognized by the reception quality variation trend recognition unit 13 (step 103) (The determination of the degree of correlation will be described in detail below.) Then, the antenna selection unit 7 selects at least two antennas to be used for the wireless communication by using information on the variation trend of the value in relation to the communication quality determined by the correlation determination unit 14 (step 104 to step 112).

Figure 2:
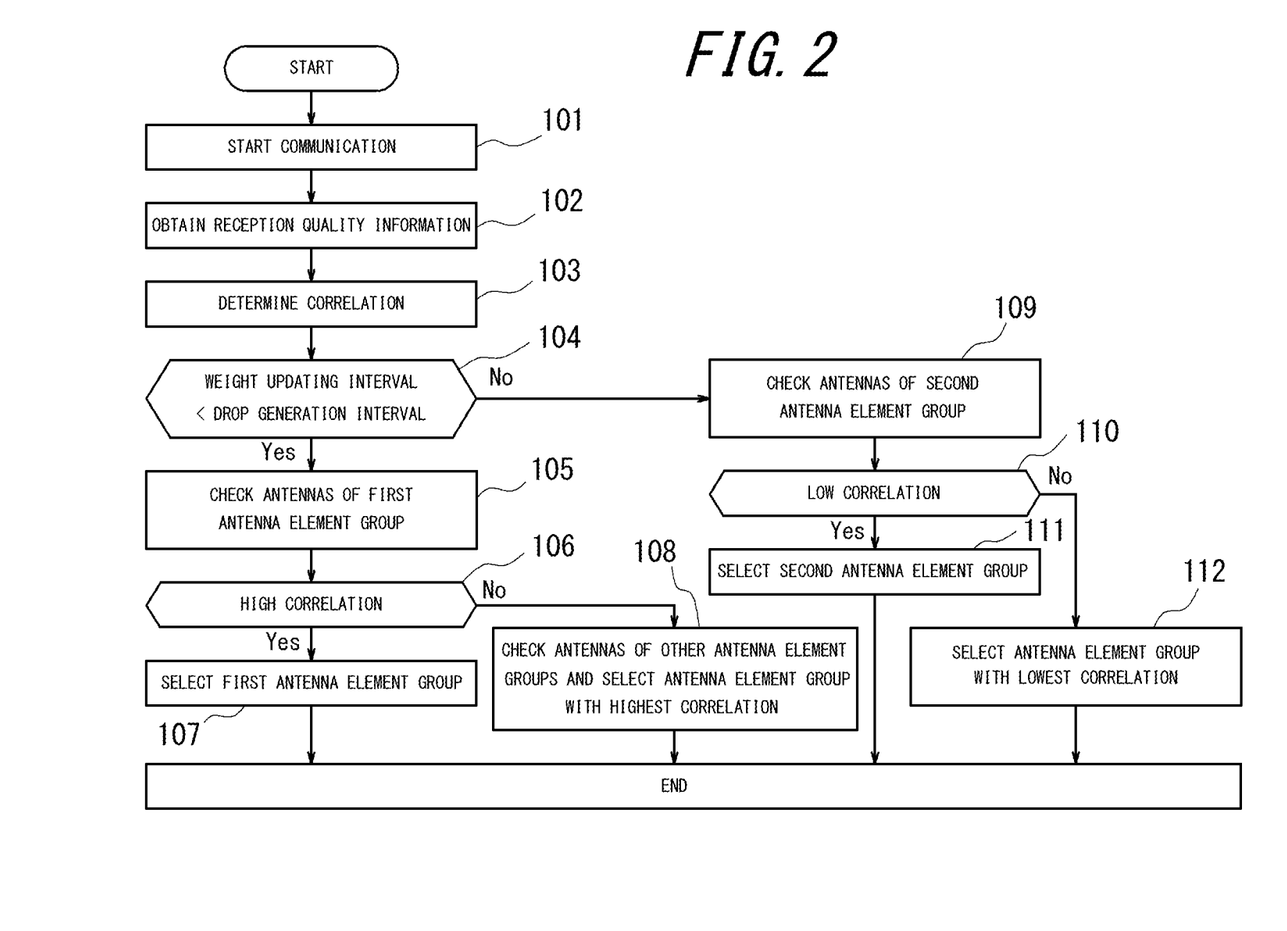
FIG. 2 is a flowchart of a method to select an antenna by an antenna selection unit based on a degree of correlation between antennas determined by a correlation determination unit.

In the flowchart shown in FIG. 2, the antenna selection unit 7, as a method of selecting an antenna, selects at least two antennas to be used for the wireless communication by using a weight updating interval at which the weight calculation unit 11 calculates a weight, and the information on the variation trend of the value in relation to the reception quality determined by the correlation determination unit 14. First, the antenna selection unit 7 compares the weight updating interval and a period (drop time interval) of occurrence of a time (timing) at which the value in relation to the reception quality becomes equal to or lower than a predetermined value in the variation trend of each antenna (step 104). If the drop time interval is longer than the weight updating interval as a result of comparison (Yes) (since in this case it is not possible to deal with variations of the transmission environment, it is preferred to select antennas with a highest possible degree of correlation), the antenna selection unit 7 checks a degree of correlation between antennas of any antenna group (first antenna group) (step 105) and determines whether the degree of correlation between the antennas is high (step 106). If determining that the degree of correlation between the antennas is high (Yes), the antenna selection unit 7 selects at least two antennas, from the first antenna group, to be used for the wireless communication (step 107). If determining that the degree of correlation between the antennas is low (No), the antenna selection unit 7 checks a degree of correlation between antennas of another antenna group and selects at least two antennas, from the antenna group with a highest degree of correlation, to be used for the wireless communication (step 108).

If the drop time interval is shorter than the weight updating interval at step 104 (No), the antenna selection unit 7 checks a degree of correlation between antennas of still another antenna group (second antenna group) (step 109) and determines whether the degree of correlation between the antennas is low (step 110). If determining that the degree of correlation between the antennas is low (Yes), the antenna selection unit 7 selects at least two antennas, from the second antenna group, to be used for the wireless communication (step 111). If determining that the degree of correlation between the antennas is high (No), the antenna selection unit 7 selects at least two antennas, from an antenna group with lowest degree of correlation, to be used for the wireless communication (step 112).

Then, the reception processing unit 8 generates a weight and, by using the weight generated, transmits and receives radio signals with the communication counterpart apparatus via the antennas selected by the antenna selection unit 7.

Next, a method to determine the degree of correlation between antennas by the correlation determination unit 14 by using the variation trend of the value in relation to the reception quality of each antenna recognized by the reception quality variation trend recognition unit 13 (step 103 in the flowchart in FIG. 2) is described.

(Method 1 to Determine the Degree of Correlation Between Antennas)

The correlation determination unit 14 detects a time at which, in the variation trend of the value in relation to the reception quality of each antenna recognized by the reception quality variation trend recognition unit 13, the value indicating the reception quality is deteriorated by a predetermined value (first predetermined value) or more in comparison with a previous value indicating the received power obtained.

Then, the correlation determination unit 14 determines the degree of correlation based on differences in the times of each antenna detected. At this point, if a time when the value indicating the reception quality is deteriorated by the predetermined value (first predetermined value) or more is detected in one antenna immediately after detection of the time of deterioration in another antenna, the degree of correlation becomes high if a difference in the times is small. In contrast, if the difference from the time when the value indicating the reception quality is deteriorated by the predetermined value or more in the other antenna is large, the degree of correlation becomes low.

(Method 2 to Determine the Degree of Correlation Between Antennas)

The correlation determination unit 14 detects a time when, in the variation trend of the value in relation to the reception quality of each antenna recognized by the reception quality variation trend recognition unit 13, a value indicating received power is equal to or lower than a predetermined value (second predetermined value). Then, the correlation determination unit 14 may determine the degree of correlation based on a frequency of such detected times of the antennas, that is, the number of times when the value indicating the received power is equal to or lower than the predetermined value (second predetermined value) in a period.

(Method 3 to Determine the Degree of Correlation Between Antennas)

The correlation determination unit 14 may determine the degree of correlation based on a time average obtained by complex multiplication of reception signals of two antennas (multiplication of complex conjugate). If the degree of correlation is high, the time average is high. In contrast, if the degree of correlation is low, the time average is a value close to zero.

(Method 4 to Determine the Degree of Correlation Between Antennas)

The correlation determination unit 14 determines a weight coefficient to be applied to each value in relation to the reception quality of each antenna based on the variation trend indicating a trend of variation of the value in relation to the reception quality with time. Then, based on an estimated received power calculated by weighting the value in relation to the reception quality with the weight coefficient, the correlation determination unit 14 may determine or estimate the degree of correlation between the antennas.

The following is a description about a case when the correlation determination unit 14 determines the degree of correlation between the antennas based on the estimated received power.

Figure 3:
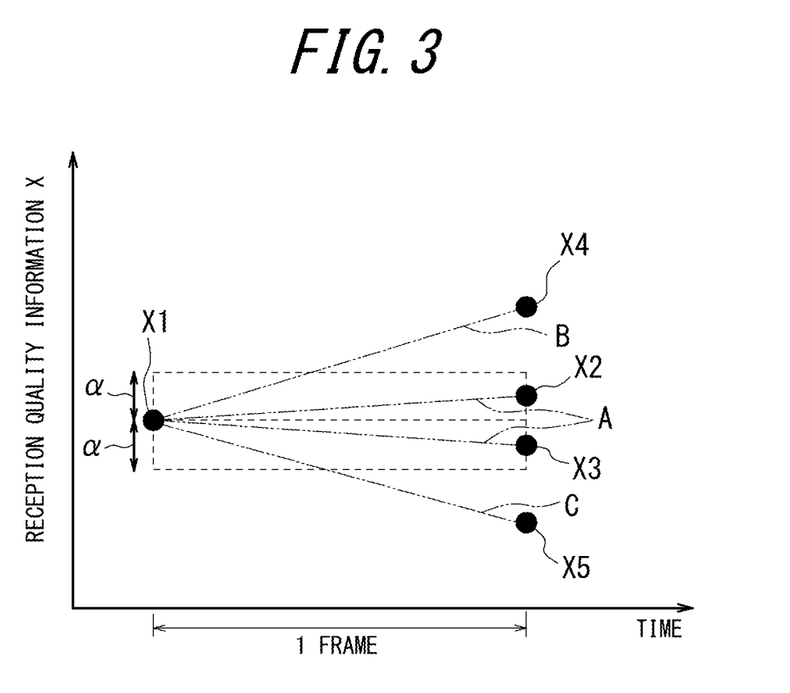
FIG. 3 is a schematic diagram showing variations of reception quality information X with time.

A variation trend of a value indicating the received power is constituted of a combination of three types of trend-A, trend-B and trend-C. Those trend-A, trend-B and trend-C are described with reference to FIG. 3. FIG. 3 is a schematic diagram showing variations of the reception quality information (the value in relation to the reception quality) X from X1 to X2~X5 with time (a period of 1 frame).

The trend-A shows variations of the reception quality information within a predetermined threshold α such as a variation from X1 to X2 or a variation from X1 to X3. Here, the predetermined threshold α is set as a range in which the reception quality may be determined as being in a stable state (to a degree of variation caused by noise of the reception quality). The trend-B shows a variation of the reception quality information from X1 to X4 exceeding the predetermined threshold a in a raising direction of the reception quality. The trend-C shows a variation of the reception quality information from X1 to X5 falling below the predetermined threshold a in a deterioration direction of the reception quality.

Figure 4A:
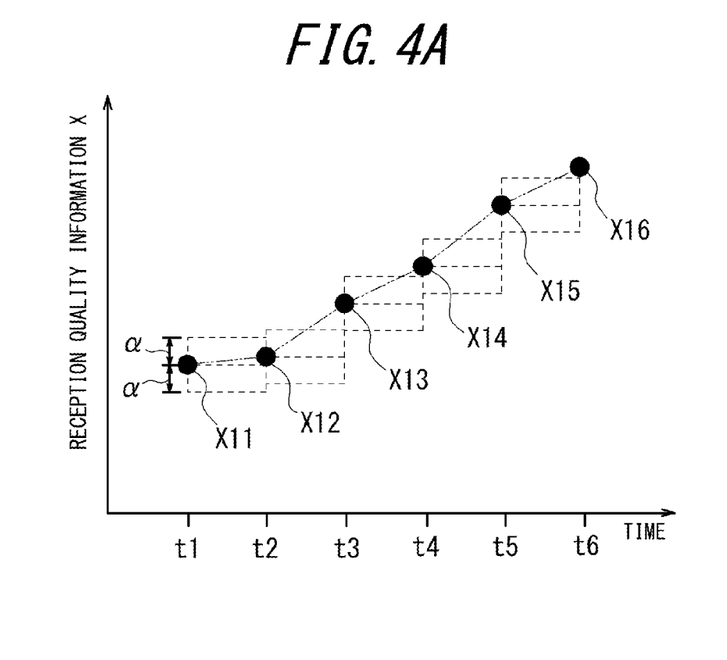
FIG. 4A is a graph of the variation of the reception quality information X with time.
Figure 4B:
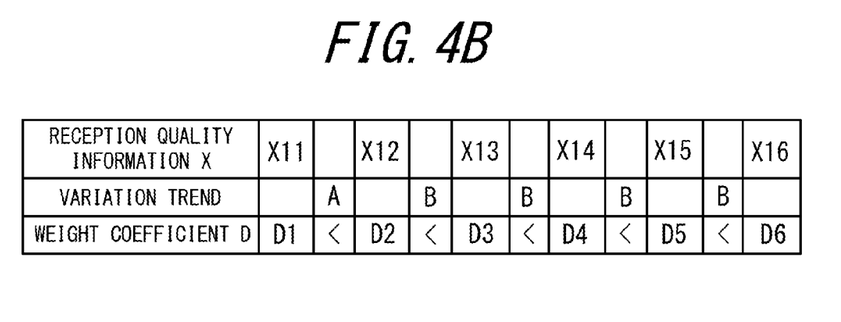
FIG. 4B is a table for a description of a method to determine a weight coefficient.

The correlation determination unit 14 determines the variation trend based on a combination of the trend-A, trend-B and trend-C. FIG. 4A is an exemplary graph indicating the variation of the reception quality information X with time. In FIG. 4A, new reception quality information is plotted as time passes from time t1 to time t6. FIG. 4B is a table for a description of a method of determining the weight coefficient.

A variation from X11 to X12 is a variation within the predetermined threshold α, it is thus shown as the trend-A as shown in FIG. 4B. In addition, a variation from X12 to X13 is a variation in the raising direction of the reception quality exceeding the predetermined threshold α, it is thus shown as the trend-B as shown in FIG. 4B. Similarly, each of three variations from X13 to X16 is shown as the trend-B.

The correlation determination unit 14 determines the variation trend as an improving type variation trend based on a combination of one trend-A and four trend-Bs (ABBBB). Then, the correlation determination unit 14 increases weight coefficients D1 to D6 to be provided to each of X11 to X16 with time such that $D1<D2<D3<D4<D5<D6$ is satisfied.

In addition, for a variation trend in combination of two trend-As and three trend-Cs (ACACC), for example, the correlation determination unit 14 determines that the variation trend is a deteriorating type variation trend. Then, the correlation determination unit 14 increases the weight coefficients D1 to D6 with time such that $D1<D2<D3<D4<D5<D6$ is satisfied.

For a variation trend in combination of five trend-As (AAAAA), the correlation determination unit 14 determines that the variation trend is a stable type variation trend. Then, the correlation determination unit 14 sets the weight coefficients D1 to D6 to a uniform value, that is, $D1=D2=D3=D4=D5=D6\neq0$.

The correlation determination unit 14 multiplies reception quality information X11 to X16 and the weight coefficients D1 to D6 corresponding to the X11 to X16, respectively, and calculates an average of multiplied values, in order to calculate the estimated received power. Then, the correlation determination unit 14 estimates a variation trend based on the estimated received power calculated and determines the degree of correlation between the antennas based on the variation trend estimated.

As stated above, the present invention enables a stable communication by dividing antennas into groups with different arrangements, and selecting antennas suitable for a condition in varying transmission environments.

Second Embodiment

Figure 5:
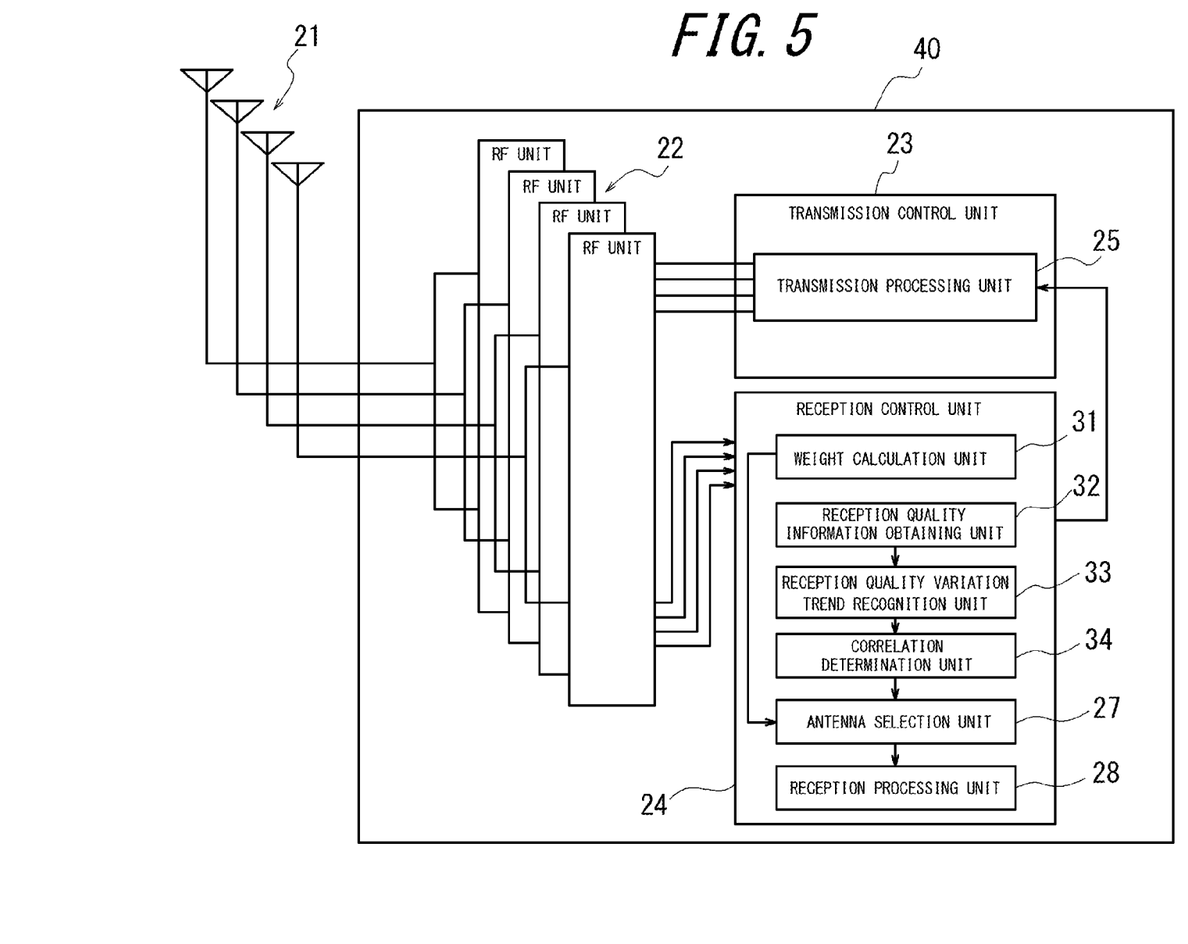
FIG. 5 is a block diagram illustrating an exemplary configuration of a wireless base station according to a second embodiment of the present invention.

FIG. 5 is a block diagram illustrating an exemplary configuration of a wireless base station according to a second embodiment of the present invention. As shown in FIG. 5, a wireless base station 40 includes a plurality of antenna elements 21, which is an array antenna, a plurality of wireless (RF) units 22 for up/down conversion of radio signals from a communication apparatus on a counterpart side (communication counterpart apparatus), a transmission control unit 23 and a reception control unit 24. The transmission control unit 23 has a transmission processing unit 25. The reception control unit 24 has a weight calculation unit (calculation unit) 31, a reception quality information obtaining unit (obtaining unit) 32, a reception quality variation trend recognition unit (recognition unit) 33, a correlation determination unit (determination unit) 34, an antenna selection unit (selection unit) 27 and a reception processing unit 28. The weight calculation unit 31 calculates a weight of each of the plurality of antennas.

The reception quality information obtaining unit 32 obtains the reception quality information indicating reception quality of each of the plurality of antennas at predetermined intervals. The reception quality variation trend recognition unit 33 recognizes a variation trend of a value in relation to the reception quality of each antenna obtained by the reception quality information obtaining unit 32. The correlation determination unit 34 determines a degree of correlation between antennas based on the variation trend of the value in relation to the reception quality of each antenna recognized by the reception quality variation trend recognition unit 33. The antenna selection unit 27 determines a transmission method for wireless communication based on the degree of correlation between antennas determined by the correlation determination unit 34 and selects an antenna, among the plurality of antennas, to be used for wireless communication. The reception processing unit 28 performs processing to form beams radiated from the antenna selected. Although the weight calculation unit 31, the reception quality information obtaining unit 32, the reception quality variation trend recognition unit 33 and the correlation determination unit 34 are provided to the reception control unit 24 in the present embodiment, those units may also be constituted independently.

The reception quality information obtaining unit 32 obtains reception quality information of radio signals received from the communication apparatus of a communication counterpart. The reception quality information obtaining unit 32 obtains a value indicating received power or a value indicating the reception quality such as SINR measured for each of the plurality of antennas as the value in relation to the reception quality in the reception quality information. The reception quality variation trend recognition unit 33 recognizes a variation trend of the value in relation to the reception quality of each antenna obtained.

The correlation determination unit 34 determines the degree of correlation based on the variation trend of the value in relation to the reception quality of each antenna recognized by the reception quality variation trend recognition unit 33.

The antenna selection unit 27 selects one of wireless communication by directivity control by using an adaptive array antenna or wireless communication by MIMO, as a transmission method for the wireless communication, based on the degree of correlation between antennas determined by the correlation determination unit 34. In addition, the antenna selection unit 27 selects at least two antenna elements, from the plurality of antennas, to be used for the wireless communication. The antennas selected by the antenna selection unit 27 are used to receive radio signals from the communication counterpart apparatus as well as to transmit radio signals to the communication counterpart apparatus.

The transmission processing unit (transmission unit) 25 transmits information on the transmission method determined by the antenna selection unit 27 to the communication counterpart apparatus in order to perform the suitable wireless communication with the communication counterpart apparatus.

Next, a method of selecting a transmission method and an antenna by the antenna selection unit 27 based on the degree of correlation between the antennas determined by the correlation determination unit 34 are described with reference to a flowchart in FIG. 6. It is assumed that the plurality of antennas is an array antenna and that the weight calculation unit 31 calculates a weight of each antenna of the array antenna.

The reception control unit 24 of the wireless base station starts communication with the communication counterpart apparatus (step 201). The reception quality information obtaining unit 32 obtains reception quality information of the radio signal received by each antenna, and the reception quality variation trend recognition unit 33 recognizes the variation trend of the value in relation to the reception quality of the reception quality information of each antenna obtained (step 202). The correlation determination unit 34 determines the degree of correlation between the antennas based on the variation trend of each antenna recognized by the reception quality variation trend recognition unit 33 (step 203) (The determination of the degree of correlation will be described in detail below.) Then, the antenna selection unit 27 determines a transmission method for the wireless communication and selects at least two antennas to be used for the wireless communication by using information on the variation trend of the value in relation to the communication quality determined by the correlation determination unit 34 (step 204 to step 212).

Figure 6:
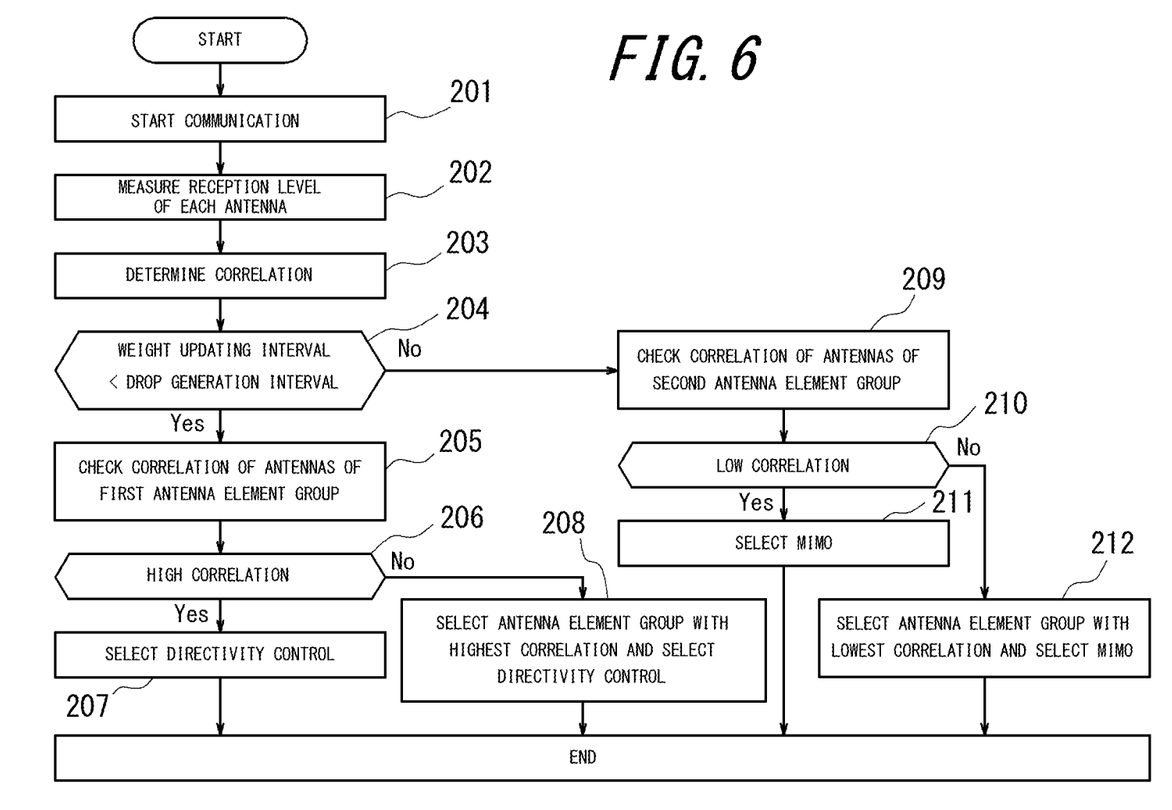
FIG. 6 is a flowchart of a method to select a transmission method and a method to select an antenna by the antenna selection unit based on the degree of correlation between the antennas determined by the correlation determination unit.

In the flowchart shown in FIG. 6, as a method of determining the transmission method and selecting antennas, the antenna selection unit 27 uses a weight updating interval at which the weight calculation unit 31 calculates a weight and information on the variation trend of the value in relation to the reception quality determined by the correlation determination unit 34. First, the antenna selection unit 27 compares the weight updating interval and a period (drop time interval) of occurrence of a time (timing) at which the value in relation to the reception quality in the variation trend of each antenna becomes equal to or lower than a predetermined value (step 204). If the drop time interval is longer than the weight updating interval as a result of comparison (Yes), the antenna selection unit 27 checks the degree of correlation between the antenna elements of an antenna element group (first antenna element group) expected to have a high degree of correlation (step 205) and determines whether the antenna element group has a truly high degree of correlation (step 206). If determining that the degree of correlation of the antenna element group is high (Yes), the antenna selection unit 27 selects the wireless communication by the directivity control in order to maintain the communication quality by following variations of the transmission environment and also selects at least two antenna elements, from the first antenna element group, to be used for the wireless communication (step 207). In this case, if an antenna element with low antenna correlation is added, it raises a possibility to deteriorate the communication quality. Therefore, it is necessary to control so as to perform the communication by selecting only antenna elements with high antenna correlation.

If determining that the degree of correlation of the antenna element group is low (No) at step 206, the antenna selection unit 27 checks a degree of correlation between antenna elements of any other antenna element groups, selects an antenna element group with the highest correlation degree, selects the wireless communication by the directivity control and also selects at least two antenna elements, from the antenna element group with the highest correlation degree, to be used for the wireless communication (step 208).

If the drop time interval is shorter than the weight updating interval at step 204 (No), the antenna selection unit 27 checks a degree of correlation between antenna elements of any other antenna element group (second antenna element group) supposed to have low degree of correlation (step 209) and determines whether the antenna element group has a truly low degree of correlation (step 210). If determining that the antenna element group has a low degree of correlation (Yes), the antenna selection unit 27 selects the wireless communication by MIMO capable of increasing a communication capacity more as the degree of correlation is lower and also selects at least two antenna elements, from the second antenna element group, to be used for the wireless communication (step 211).

If determining that the antenna element group has a high degree of correlation (No) at step 210, the antenna selection unit 27 selects an antenna element group with a lowest degree of correlation, selects the wireless communication by MIMO and also selects at least two antenna elements, from the antenna element group with the lowest degree of correlation, to be used for the wireless communication (step 212).

Then, the reception processing unit 28 generates a weight and, by using the weight generated, transmits and receives radio signals to/from the communication counterpart apparatus via the antennas selected by the antenna selection unit 27.

Next, a method to determine the degree of correlation between antennas by the correlation determination unit 34 by using the variation trend of the value in relation to the reception quality of each antenna recognized by the reception quality variation trend recognition unit 33 (step 203 in the flowchart in FIG. 6) is described.

(Method 1 to Determine the Degree of Correlation Between Antennas)

The correlation determination unit 34 detects a time at which, in the variation trend of the value in relation to the reception quality of each antenna recognized by the reception quality variation trend recognition unit 33, the value indicating the received power falls by a predetermined value or more in comparison with a previous value indicating the received power obtained. Then, the correlation determination unit 34 determines the degree of correlation based on difference in the detected times of antennas. At this point, if a time when the value indicating the reception quality falls by a predetermined value (third predetermined value) or more is detected in another antenna immediately after detection of the time in one antenna, the degree of correlation becomes high if a difference in the times is small. In contrast, if the difference from the time when the value indicating the reception quality falls by the predetermined value or more in the other antenna is large, the degree of correlation is low.

(Method 2 to Determine the Degree of Correlation Between Antennas) The correlation determination unit 34 detects a time at which, in the variation trend of the value in relation to the reception quality of each antenna recognized by the reception quality variation trend recognition unit 33, a value indicating received power is equal to or lower than a predetermined value (fourth predetermined value). Then, the correlation determination unit 34 may determine the degree of correlation based on a frequency of such detected times for the antennas, that is, the number of times when the value indicating the received power is equal to or lower than the predetermined value in a period.

(Method 3 to Determine the Degree of Correlation Between Antennas)

The correlation determination unit 34 may determine the degree of correlation based on a time average obtained by complex multiplication of reception signals of two antennas (multiplication of complex conjugate). If the degree of correlation is high, the time average is high. In contrast, if the degree of correlation is low, the time average is a value close to zero.

(Method 4 to Determine the Degree of Correlation Between Antennas)

The correlation determination unit 34 determines a weight coefficient to be applied to each value indicating the received power in relation to the reception quality of each antenna based on the variation trend of the value in relation to the reception quality with time. Then, based on an estimated received power calculated by providing the value indicating the received power with the weight coefficient, the correlation determination unit 34 may determine or estimate the degree of correlation between the antennas.

The following is a description about a case when the correlation determination unit 34 determines the degree of correlation between antennas based on the estimated received power.

Figure 7:
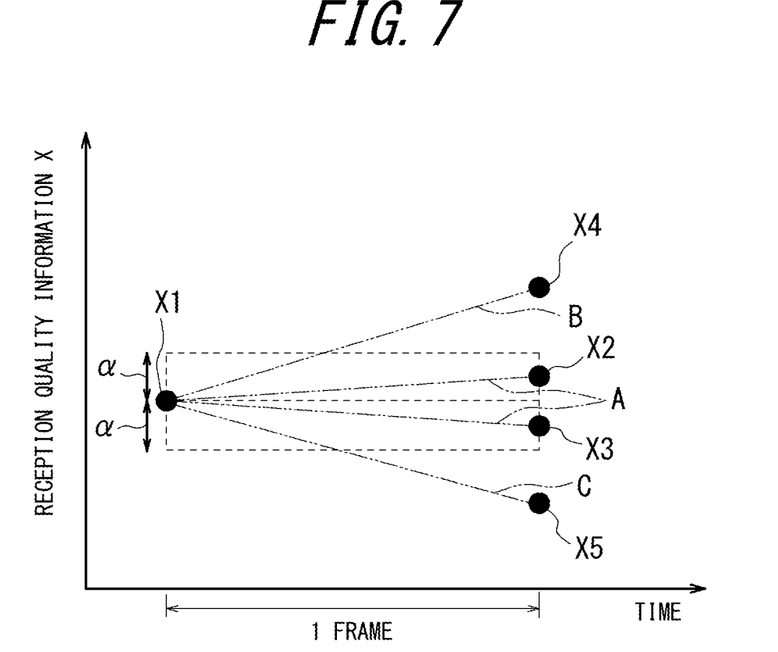
FIG. 7 is a schematic diagram showing variations of reception quality information X with time.

A variation trend of a value indicating the received power is constituted of a combination of three types of trend-A, trend-B and trend-C. Those trend-A, trend-B and trend-C are described with reference to FIG. 7. FIG. 7 is a schematic diagram showing variations of the reception quality information (the value in relation to the reception quality) X from X1 to X2~X5 with time (a period of 1 frame).

The trend-A shows variations of the reception quality information within a predetermined threshold α such as a variation from X1 to X2 or a variation from X1 to X3. Here, the predetermined threshold a is set as a range in which the reception quality may be determined as being in a stable state (to a degree of variation caused by noise of the reception quality). The trend-B shows a variation of the reception quality information from X1 to X4 exceeding the predetermined threshold α in an raising direction of the reception quality. The trend-C shows a variation of the reception quality information from X1 to X5 falling below the predetermined threshold a in a deterioration direction of the reception quality.

Figure 8A:
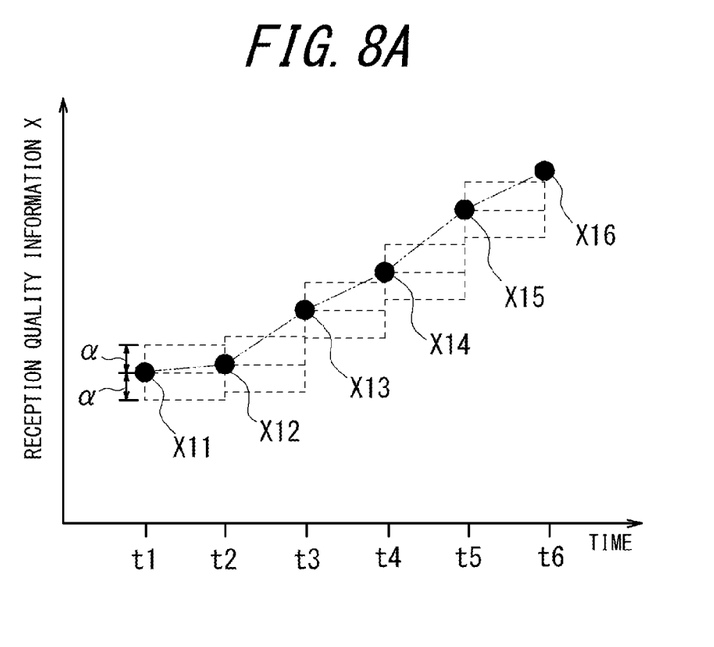
FIG. 8A is a graph of the variation of the reception quality information X with time.
Figure 8B:
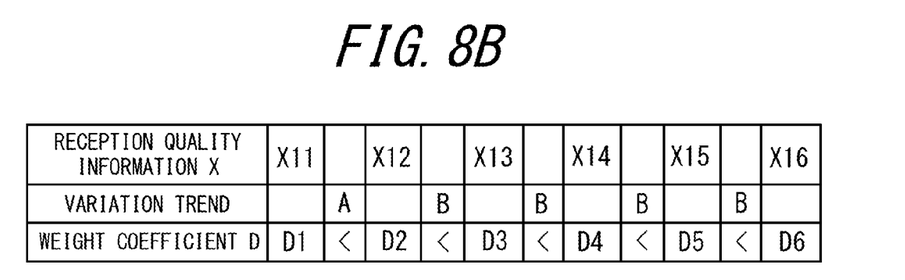
FIG. 8B is a table for a description of the method to determine the weight coefficient.

The correlation determination unit 34 determines the variation trend based on a combination of the trend-A, trend-B and trend-C. FIG. 8A is an example of a graph indicating the variation of the reception quality information X with time. In FIG. 8A, new reception quality information is plotted as time passes from time t1 to time t6. FIG. 8B is a table for a description of a method of determining the weight coefficient.

A variation from X11 to X12 is a variation within the predetermined threshold α, it is thus shown as the trend-A as shown in FIG. 8B. In addition, a variation from X12 to X13 is a variation in the raising direction of the reception quality exceeding the predetermined threshold α, it is thus shown as the trend-B as shown in FIG. 8B. Similarly, each of three variations from X13 to X16 is shown as the trend-B.

The correlation determination unit 34 determines the variation trend as an improving type variation trend based on a combination of one trend-A and four trend-Bs (ABBBB). Then, the correlation determination unit 34 increases weight coefficients D1 to D6 to be applied to X11 to X16, respectively, with time such that D1<D2<D3<D4<D5<D6 is satisfied.

In addition, for a variation trend in combination of two trend-As and three trend-Cs (ACACC), for example, the correlation determination unit 34 determines that the variation trend is a deteriorating type variation trend. Then, the correlation determination unit 34 increases the weight coefficients D1 to D6 with time such that D1<D2<D3<D4<D5<D6 is satisfied.

For a variation trend in combination of five trend-As (AAAAA), the correlation determination unit 34 determines that the variation trend is a stable type variation trend. Then, the correlation determination unit 34 sets the weight coefficients D1 to D6 a uniform value, that is, D1=D2=D3=D4=D5=D6≠0.

The correlation determination unit 34 multiplies reception quality information X11 to X16 and the weight coefficients D1 to D6 corresponding to the X11 to X16, respectively, and calculates an average of multiplied values, in order to calculate the estimated received power. Then, the correlation determination unit 34 estimates a variation trend based on the estimated received power calculated and determines the degree of correlation between the antennas based on the variation trend estimated.

As stated above, in the flowchart shown in FIG. 6, the antenna selection unit 27 determines the wireless communication by the directivity control or the wireless communication by MIMO as the transmission method and also selects at least two antennas to be used for the wireless communication. However, there may be a case that any transmission method fails to maintain the communication quality according to wireless conditions between the wireless base station and the counterpart communication apparatus. Therefore, according to the present invention, in consideration of such case, it is also possible to select not only the wireless communication by the directivity control or the wireless communication by MIMO as stated above but also select diversity when selecting the transmission method and perform wireless communications by using a single antenna. At such selection, the antenna selection unit 27 may select the transmission method and an antenna to be used, by using the weight updating interval at which the weight calculation unit 31 calculates the weight and information on the variation trend of the value in relation to the reception quality determined by the correlation determination unit 34.

As stated above, since the present invention selects a transmission method suitable for a transmission environment based on the variation trend of the value in relation to the communication quality of each antenna and also selects an antenna suitable for the transmission method selected, it enables to maintain the communication quality and obtain optimum throughput.

The invention claimed is:

1. A wireless base station having a plurality of antennas and performing wireless communication by using at least two antennas comprising:
    an obtaining unit that obtains information concerning reception quality of each of the plurality of antennas;
    a recognition unit that recognizes a variation trend of a value in relation to reception quality of each of the antennas obtained by the obtaining unit;
    a determination unit that determines a degree of correlation between the antennas based on the variation trend of the value in relation to the reception quality of each of the antennas recognized by the recognition unit, and
    a selection unit that selects at least two antennas, among the plurality of antennas, to be used for wireless communication, based on the degree of correlation between the antennas determined by the determination unit.

2. The wireless base station according to claim 1, wherein the determination unit detects a time at which, in the variation trend of the value in relation to the reception quality of each of the antennas recognized by the recognition unit, the value in relation to the reception quality falls by a first predetermined value or more in comparison with a previous value in relation to the reception quality obtained, and determines the degree of correlation based on a difference in the time detected for each of the antennas.

3. The wireless base station according to claim 1, wherein the determination unit detects a time at which, in the variation trend of the value in relation to the reception quality of each of the antennas recognized by the recognition unit, the value in relation to the reception quality becomes equal to or lower than a second predetermined value, and determines the degree of correlation based on a frequency of the detected time at which the value in relation to the reception quality of each of the antennas becomes equal to or lower than the predetermined value.

4. The wireless base station according to claim 1, further comprising a calculation unit that calculates a weight of each of the plurality of antennas,
wherein the selection unit selects at least two antennas to be used for the wireless communication based on an interval to calculate the weight by the calculation unit and a period of occurrence of the time determined by the determination unit.

5. The wireless base station according to claim 1, wherein the obtaining unit obtains reception quality information of radio signals received by each of the plurality of antennas at a predetermined interval,
the recognition unit recognizes the variation trend of the value in relation to the reception quality of each of the antennas, and
the determination unit estimates a value in relation to the reception quality of each of the antennas based on the variation trend of each of the antennas and determines the degree of correlation between the antennas based on the estimated value in relation to the reception quality.

6. A wireless communication method of a wireless base station having a plurality of antennas and performing wireless communication by using at least two antennas comprising:
obtaining information regarding reception quality of each of the plurality of antennas;
recognizing a variation trend of a value in relation to the reception quality of each of the antennas;
determining a degree of correlation between the antennas based on the recognized variation trend of the value in relation to the reception quality of each of the antennas, and
selecting at least two antennas, among the plurality of antennas, to be used for the wireless communication, wherein selection of the at least two antennas is based on the determined degree of correlation between the antennas.

7. A wireless base station having a plurality of antennas and performing wireless communication with a communication counterpart apparatus comprising:
an obtaining unit that obtains information concerning reception quality of each of the plurality of antennas;
a recognition unit that recognizes a variation trend of a value in relation to reception quality of each of the antennas obtained by the obtaining unit;
a determination unit that determines a degree of correlation between the antennas based on the variation trend of the value in relation to the reception quality of each of the antennas recognized by the recognition unit,
a selection unit that determines a transmission method of the wireless communication based on the variation trend of the value in relation to the reception quality of each of the antennas recognized by the recognition unit and selects an antenna, among the plurality of antennas, to be used by the transmission method determined, wherein the selection unit selects an antenna to be used for the wireless communication based on the degree of correlation between the antennas determined by the determination unit; and
a transmission unit that transmits information on the transmission method determined by the selection unit to the communication counterpart apparatus.

8. The wireless base station according to claim 7, wherein the determination unit detects a time at which, in the variation trend of the value in relation to the reception quality of each of the antennas recognized by the recognition unit, the value in relation to the reception quality falls by a third predetermined value or more in comparison with a previous value in relation to the reception quality obtained, and determines the degree of correlation based on a difference in the detected time of each of the antennas.

9. The wireless base station according to claim 7, wherein the determination unit detects a time at which, in the variation trend of the value in relation to the reception quality of each of the antennas recognized by the recognition unit, the value in relation to the reception quality becomes equal to or lower than a fourth predetermined value, and determines the degree of correlation based on a frequency of detected time at which the value in relation to the reception quality of each of the antennas becomes equal to or lower than the predetermined value.

10. The wireless base station according to claim 7, wherein the plurality of antennas is an array antenna and the selection unit decides wireless communication by directivity control or wireless communication by MIMO as the transmission method of the wireless communication.

11. The wireless base station according to claim 7, further comprising a calculation unit that calculates a weight of each of the plurality of antennas,
wherein the selection unit determines the transmission method to be used for the wireless communication, based on an interval to calculate the weight by the calculation unit and a period of occurrence of the time determined by the determination unit.

12. The wireless base station according to claim 7, wherein the obtaining unit obtains reception quality information of radio signals received by each of the plurality of antennas at predetermined intervals,
the recognition unit recognizes the variation trend of the value in relation to the reception quality of each of the antennas, and
the determination unit estimates a value in relation to the reception quality of each of the antennas in a predetermined period based on the variation trend of each of the antennas and determines the degree of correlation between the antennas based on the estimated value in relation to the reception quality.

13. A wireless communication method of a wireless base station having a plurality of antennas and performing wireless communication with a communication counterpart apparatus comprising:
obtaining information concerning reception quality of each of the plurality of antennas;
recognizing a variation trend of a value in relation to the obtained reception quality of each of the antennas;
determining a degree of correlation between the antennas based on the recognized variation trend of the value in relation to the reception quality of each of the antennas,
determining a transmission method of the wireless communication based on the recognized variation trend of the value in relation to the reception quality of each of the antennas and selecting an antenna, among the plurality of antennas, to be used for the wireless communication, wherein selection of the antenna to be used for the wireless communication is based on the determined degree of correlation between the antennas; and
transmitting information using the determined transmission method to the communication counterpart apparatus.

* * * * *